May 11, 1954  K. HÜBNER  2,677,968
SPEED CHANGING MECHANISM
Filed April 3, 1951  3 Sheets-Sheet 1
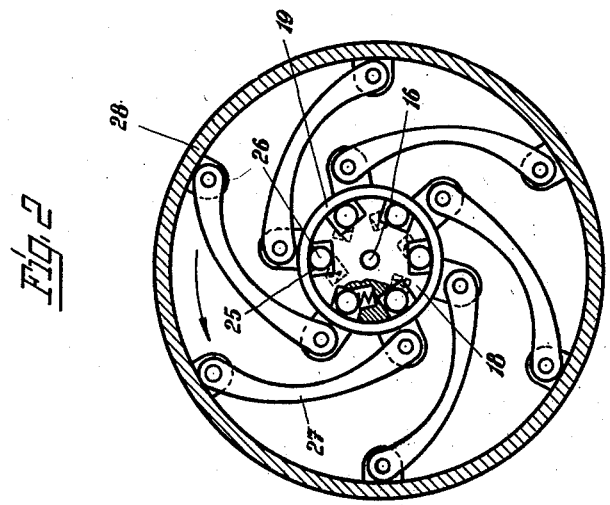
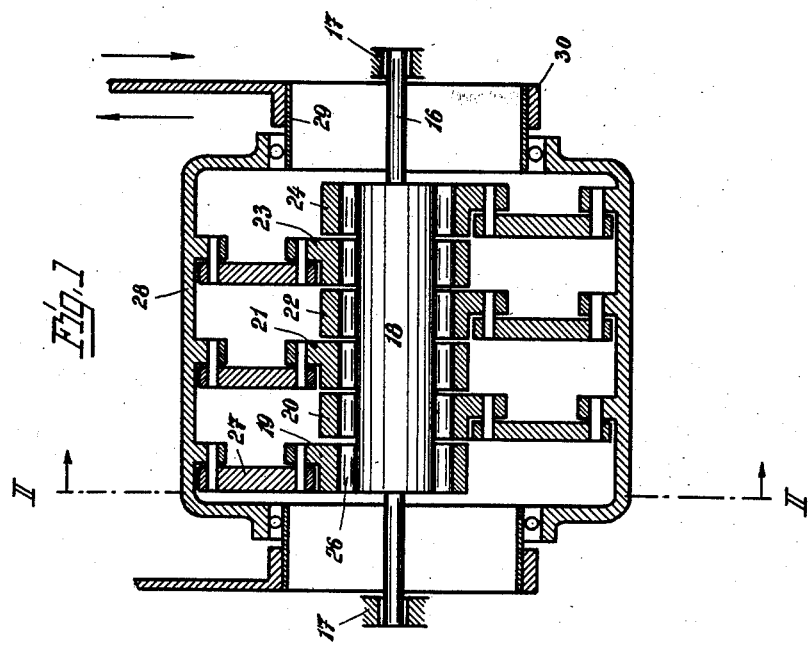
KAMILL HÜBNER
INVENTOR:
By Richardson, David and Nordon
his ATTYS.

May 11, 1954         K. HÜBNER         2,677,968
SPEED CHANGING MECHANISM
Filed April 3, 1951                            3 Sheets-Sheet 2
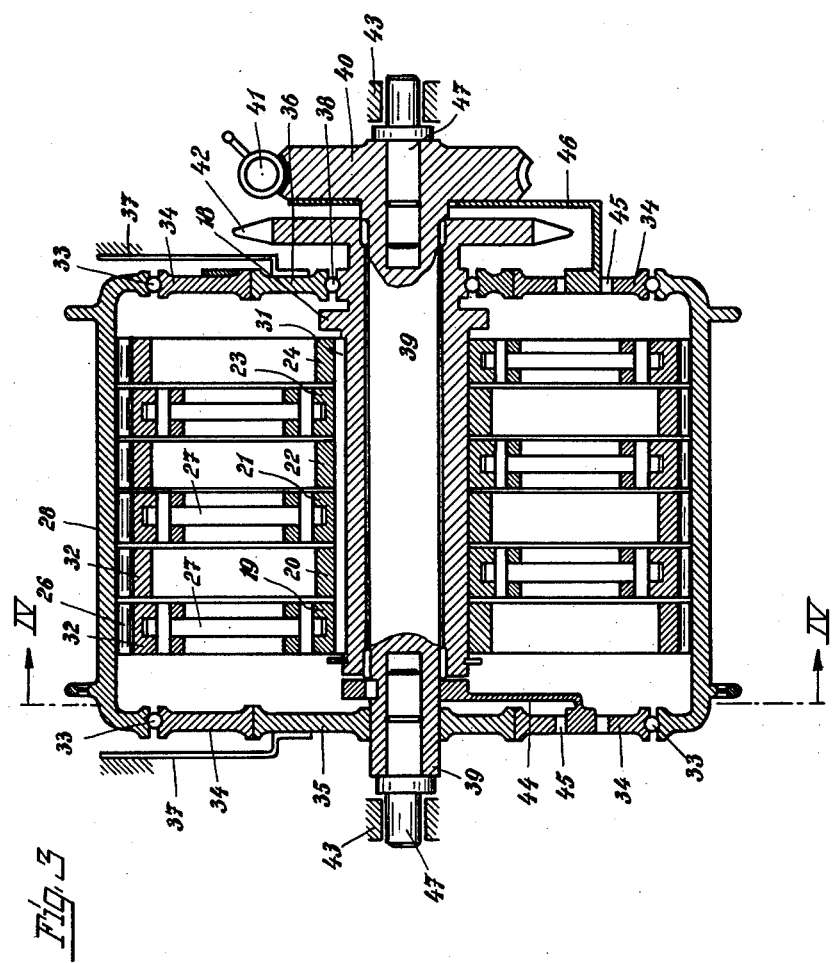
KAMILL HÜBNER
INVENTOR May 11, 1954 K. HÜBNER 2,677,968
SPEED CHANGING MECHANISM
Filed April 3, 1951 3 Sheets-Sheet 3

KAMILL HÜBNER
INVENTOR.
By Richardson, David and Nordon
his ATTYS.

Patented May 11, 1954

2,677,968

UNITED STATES PATENT OFFICE 2,677,968

SPEED CHANGING MECHANISM

Kamill Hübner, Munich, Germany

Application April 3, 1951, Serial No. 219,007

4 Claims. (Cl. 74—112)

The present invention relates to an infinitely variable speed changing mechanism which is based on the principle of a mutual radial displacement of the driving and driven part thereof. In such a mechanism the driving and the driven parts are connected by coupling arms which are linked to one part and are in engagement with the other part by means of roller friction clutches acting in dependance upon the difference in the speed of the said two parts.

Such gears have not found practical application, because each individual arm is connected only through a single wedging member with the one part of the clutch, so that this wedging member is subjected to extremely high stresses. In practice it is impossible to perform the engagement of both parts of the clutch by means of a single wedging member without the danger of a breakdown at high loads, and even if this should be possible, deformations due to the high load would be unavoidable so that the engagement and the disengagement of the clutch could not take place at a certain predetermined mutual position, that is at the same angular velocity.

It is the object of the present invention to provide a gear based on the principle above specified which avoids the danger of deformation of the parts of the roller friction clutch due to overloading. To this end it is suggested that each coupling arm is provided with a separate rotary member and that each rotary part, forming one part of the clutch, is connected with the coacting part of the clutch by means of a number of wedging members evenly distributed around the circumference of the rotary part. The arrangement may be such that each arm is connected with one ring and that the rings are arranged in successive planes. Each wedging member may be in the form of a roller or ball loaded by a spring in a manner known per se.

Two embodiments of the present invention are represented in the accompanying drawings, wherein:

Figure 1 represents a longitudinal section through a gearing, the individual coupling arms being shown in one plane to simplify the representation;

Figure 2 shows a section along the line II—II on Figure 1;

Figure 3 represents a longitudinal section through a modified construction of the gear.

Figure 4:
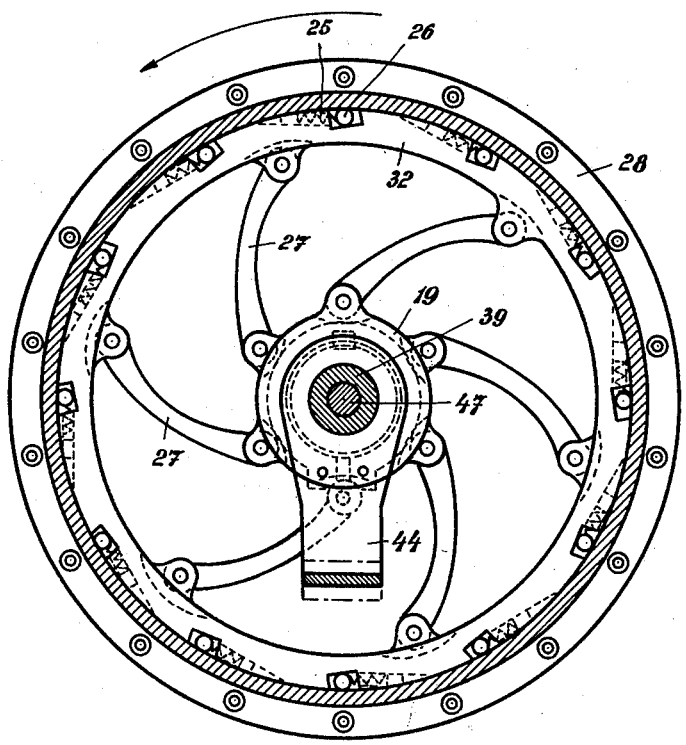
Figure 4 is a section along the line IV—IV of Figure 3.

A driving shaft 16, which is supported in two bearings 17, has a central part of a larger diameter thus forming a drum 18. Upon this drum-shaped part 18 are mounted six rings 19, 20, 21, 22, 23 and 24 so that they are free to rotate. The drum 18 is provided with recesses 25 forming cam surfaces in the range of each of the rings 19 to 24, and within said recesses, distributed around the circumference of each ring, spring loaded rollers 26 are provided which form the wedging or friction members between the rings 19 to 24 and the driving shaft 16, 18.

Each ring 19 to 24, carries a single coupling arm 27 which is linked to the ring and bent to form an arc, and is connected at its other end to the inner surface of a casing 28 which represents the driven part. As the rings 19 to 24 are situated in successive planes perpendicular to the shaft axis, the six coupling arms are also situated in these planes; they lie one behind the other in an axial direction and are angularly displaced with respect to one another as shown in Figure 2; this angular displacement is not shown in Figure 1 as mentioned above.

The casing 28 is rotatably supported by short tubes 29 which are adapted to be displaced in a radial direction by means of rings 30 and actuating rods connected to said rings, so that a radial or an eccentric displacement can be imparted to the casing 28 with respect to the shaft 16.

The driving shaft 16 rotates in the direction indicated by the arrow in Figure 2. If the shaft 16 is driven in this direction and if the driving part 16 and the driven part 28 are concentric, then all the rings 19 to 24 are caused to rotate by their wedging members 26. If, however, the casing 28 is displaced in a radial direction with respect to the shaft 16 so that these parts are no longer concentric, only that ring of the rings 19 to 24 is in engagement with the drum 18 which imparts to the casing 28 through the corresponding coupling arm 27 the higher velocity. All the other rings are caused by the casing 28 and the arm 27 to rotate with the same higher speed, so that these rings overrun the driving shaft 18 whereby they are disengaged.

The coupling arms 27 may consist of several parts linked together, which renders the advantage that the additional path covered by the arms as a result of their angular movement would be still greater compared with the case represented in the drawings. The arrangement may also be such that the individual arms are not linked to the casing 28, but to an arm 27 connecting the ring directly to the casing 28.

From the foregoing it is self-understood that the pressures occurring in the clutch are considerably reduced due to the fact that the engagement takes place along the whole circumference of the drum-shaped part 18.

Due to the general arrangement of the roller friction clutch and particularly as a result of the spring loading of the roller 26, an instantaneous action of the clutch is ensured as soon as one of the rings 19 to 24 has the same speed as the shaft 18. Should the engagement be delayed, the total regulating range of the gear would be considerably reduced.

In the modification shown in Fig. 3, the driving part 18 of the gear carries on its circumference driving rings 19, 20, 21, 22, 23 and 24 which are arranged one behind the other in an axial direction and are rigidly keyed to the part 18 by means of a common key 31. To each driving ring 19 to 24 a coupling arm 27 is linked, which are represented in Figure 3 in one plane, which, however, are in fact angularly displaced and form angles of about 60° between one another as shown in Figure 4. The outer free end of each coupling arm is connected to a driving member 32, forming one part of the clutch which accommodates the wedging balls or rollers 26 as well as the loading springs 25. These wedging rollers co-operate with the inner circumference of the driven part of the clutch which is formed by the surrounding casing 28, which forms in the present case the hub of the rear wheel of a cycle. The surrounding casing 28 is supported through balls 33 by rings 34 at both sides, and in each of the rings 34 an eccentric ring 35 and 36 is eccentrically mounted. The inner eccentric rings 35 and 36 are held by means of arms 37, which may be connected for instance with the frame of the cycle.

The ring 36 is supported through balls 38 by the driving part 18, which forms a sleeve and through which a rigid pin 39 extends so that it is free to rotate. This rigid pin 39 passes through the eccentric ring 35 eccentrically and carries a worm-gear 40 which is in engagement with a worm 41.

Upon the driving part 18 a sprocket wheel 42 is mounted from which the drive is derived, and each end face of the pin 39 is provided with a bore into which smaller detachable pins 47 are inserted, which are fixed in the present case to the fork 43 of the rear cycle wheel. The pin 39 is at one side connected to the outer ring 34 by means of an arm 44. This arm 44 engages a slot 45 provided in the eccentric 34, so that it is adapted to impart an angular displacement to the ring 34 with respect to the ring 35. Similarly is the worm wheel 40 connected to the surrounding eccentric 34 by means of an arm 46, and this arm also engages a slot 45.

If the worm 41 and with it the worm wheel 40 is rotated, the pin 39 and with it the rings 34 are turned with the result that the axis of the driving part 18 is moved into an eccentric position with respect to the axis of the driven part 28. Only that ring 32 of the different clutches becomes engaged through the wedging rollers 26 with the inner wall of the surrounding casing 28, which would have a speed higher than the speed of the casing if there were no clutch.

The arrangement of the rings 32 of the clutch at the outer end of the coupling arms 27 provides a substantial constructive advantage. It is made possible to arrange a considerable number of wedging rollers 26 along the circumference of each ring 32. In addition, it is easily possible to provide the required eccentricity between the driving part and the driven part of the clutch. The construction is compact and comparatively simple. The driving part 18 is of course mounted on the pin 39 by means of ball or rollers in the usual manner.

What I claim is:

1. Variable speed gear mechanism including a tubular driving member, an elongated rotatable pin extending through said tubular member, an inner ring member mounted on one end of said pin, an inner ring member mounted on the opposite end of said tubular driving member, a plurality of outer ring members encircling said inner ring members and displaceably mounted thereon, a hollow cylindrical driven casing encompassing said tubular driving member and rotatably mounted on the exterior peripheries of said outer ring members, a plurality of radial arms having the inner ends thereof connected to said tubular driving member, a plurality of annular members carried on the outer ends of said radial arms, a plurality of wedging members carried on the outer circumferences of said annular members adjacent said driven casing, and means for rotating and displacing said outer ring members, whereby the axis of the tubular driving member is displaced radially relative to the axis of the driven casing, so that the wedging members are caused selectively to engage the driven casing, for coupling said driving member and driven casing, upon the occurrence of a difference in speed therebetween.

2. Variable speed gear mechanism including a tubular driving member, an elongated rotatable pin extending through said tubular member, an inner ring member mounted on one end of said pin, an inner ring member mounted on the opposite end of said tubular driving member, a plurality of outer ring members encircling said inner ring members and displaceably mounted thereon, a hollow cylindrical driven casing encompassing said tubular driving member and rotatably mounted on the exterior peripheries of said outer ring members, a plurality of rings fastened to said tubular driving member and disposed axially therealong, a plurality of radial arms extending from said rings, a plurality of annular members carried on the outer ends of said arms, a plurality of spring-pressed wedging members carried on the outer circumferences of said annular members adjacent said driven casing, and means for rotating and displacing said outer ring members, whereby the axis of the tubular driving member is displaced radially relative to the axis of the driven casing, so that the wedging members are caused selectively to engage the driven casing, for coupling said driving member and driven casing, upon the occurrence of a difference in speed therebetween.

3. Variable speed gear mechanism including a tubular driving member, an elongated rotatable pin extending through said tubular member, an inner ring member mounted on one end of said pin, an inner ring member mounted on the opposite end of said tubular driving member, a plurality of outer ring members encircling said inner ring members and displaceably mounted thereon, a hollow cylindrical driven casing encompassing said tubular driving member and rotatably mounted on the exterior peripheries of said outer ring members, a plurality of rings fastened to said tubular driving member and disposed axially therealong, a plurality of radial arms extending from said rings, a plurality of annular members carried on the outer ends of said arms, a plurality of spring-pressed wedging members carried on the outer circumferences of said annular members adjacent said driven casing, and means for rotating and displacing said outer ring members, whereby the axis of the tubular driving member is displaced radially relative to the axis of the driven casing, so that the wedging members are caused selectively to engage the driven casing, for coupling said driving member and driven casing upon the occurrence of a difference in speed therebetween, said last means including a motor operatively connected to one end of said pin for rotating the same, a rigid arm connected to one end of said pin and to one of said outer ring members, and a rigid arm connected to the opposite end of said tubular driving member and to another of said outer ring members.

4. Variable speed gear mechanism including a tubular driving member, an elongated rotatable pin extending through said tubular member, an inner ring member mounted on one end of said pin, an inner ring member mounted on the opposite end of said tubular driving member, a plurality of outer ring members encircling said inner ring members and displaceably mounted thereon, a hollow cylindrical driven casing encompassing said tubular driving member and rotatably mounted on the exterior peripheries of said outer ring members, a plurality of rings fastened to said tubular driving member and disposed axially therealong, a plurality of radial arms extending from said rings, a plurality of annular members carried on the outer ends of said arms, said annular members having recesses in their outer circumferences, a plurality of spring-pressed wedging rollers mounted in said recesses and adapted to engage the inner surface of said driven casing, and means for rotating and displacing said outer ring members whereby the axis of the tubular driving member is displaced radially relative to the axis of the driven casing, so that the wedging rollers are caused selectively to engage the driven casing, for coupling said driving member and driven casing upon the occurrence of a difference in speed therebetween.

References Cited in the file of this patent

UNITED STATES PATENTS

| Number | Name | Date |
|---|---|---|
| 1,072,237 | Johnson et al. | Sept. 2, 1913 |
| 1,702,923 | Aeppli | Feb. 19, 1929 |

FOREIGN PATENTS

| Number | Country | Date |
|---|---|---|
| 341,421 | Italy | June 24, 1936 |
| 474,204 | Germany | Mar. 14, 1929 |

OTHER REFERENCES

Product Engineering, pages 148–149, November 1950.